(12) United States Patent
Nagel et al.

(10) Patent No.: US 6,680,120 B1
(45) Date of Patent: Jan. 20, 2004

(54) BAKED ENAMEL

(75) Inventors: Rolf Nagel, Bramsche (DE); Gerhard Boockmann, Niederlauer (DE); Laurent Preux, Chozeau (FR)

(73) Assignee: Nexans, Paris (FR)

( * ) Notice: Subject to any disclaimer, the term of this patent is extended or adjusted under 35 U.S.C. 154(b) by 0 days.

(21) Appl. No.: 09/456,920

(22) Filed: Dec. 7, 1999

(30) Foreign Application Priority Data

Jan. 27, 1999 (DE) .......................... 199 03 137

(51) Int. Cl.$^7$ .............. D02G 3/00; H01B 7/00
(52) U.S. Cl. ............... 428/383; 428/375; 428/379; 174/110 SR; 174/110 N; 174/120 SR
(58) Field of Search ................. 428/375, 379, 428/383; 174/110 SR, 110 N, 120 SR

(56) References Cited

U.S. PATENT DOCUMENTS

| | | | |
|---|---|---|---|
| 3,953,649 A | | 4/1976 | Suzuki et al. |
| 4,042,750 A | | 8/1977 | Hanson et al. |
| 4,186,241 A | * | 1/1980 | Janssen ................. 428/458 |
| 4,420,535 A | * | 12/1983 | Walrath et al. .......... 428/383 |
| 4,420,536 A | * | 12/1983 | Saunders et al. ........ 428/383 |
| 4,672,094 A | | 6/1987 | Nelb, II et al. |
| 5,059,660 A | | 10/1991 | Hoessel et al. |
| 5,607,719 A | * | 3/1997 | Winkler et al. .......... 427/117 |
| 6,063,496 A | * | 5/2000 | Jozokos et al. .......... 428/379 |
| 6,159,600 A | * | 12/2000 | Ryang et al. ............ 428/379 |

FOREIGN PATENT DOCUMENTS

| | | |
|---|---|---|
| DE | 1100849 | 3/1961 |
| DE | 2203251 | 8/1973 |
| DE | 119327 | 4/1976 |
| DE | 3714033 A1 | 11/1988 |
| DE | 3909483 A1 | 9/1990 |
| EP | 0399396 A2 | 11/1990 |
| EP | 0461389 A1 | 12/1991 |
| JP | 212507 | * 8/2000 |

* cited by examiner

Primary Examiner—Cynthia H. Kelly
Assistant Examiner—J. M. Gray
(74) Attorney, Agent, or Firm—Sughrue Mion, PLLC

(57) ABSTRACT

A baked enamel with a thermoplastic polyamide, wherein the the enamel comprises a cross-linking agent that causes chemical cross-linking of the thermoplastic polymer under the action of heat, whereby the cross-linking agent comprises a polyvalent alcohol, a polyisocyanate as well as polyol. A wire with a topcoat of such a baked enamel is also described.

8 Claims, 2 Drawing Sheets

BAKED ENAMEL

This application is based on and claims the benefit of German Patent Application No. 19903137.1 filed Jan. 27, 1999, which is incorporated by reference herein.

BACKGROUND OF THE INVENTION

The invention relates to a baked enamel, particularly for coating a wire, with a thermoplastic polyamide. The invention is further directed to a wire coated with such an enamel.

Baked enamels can be applied in their liquid state to the surface of substrates and can be bonded through heating after curing. Of particular significance are baked enamel wires comprising an electrical conductor and a topcoat of a baked enamel between which there is typically one or several electrically insulating coating layers. Baked enamel wires are used, in particular, in the production of coils, e.g., as windings for motors, electromagnets or deflector coils for display screens. The formed windings are bonded together by heating with the aid of the baked enamel coat so as to melt them into a mechanically solid composite.

Prior art baked enamel consists of a thermoplastic polymer that is dissolved in a solvent for application to the substrate. After the enamel has been applied, the substrate generally passes through an oven for drying. Usually, the baked enamel is applied in layers in several passes and subsequently dried after each.

U.S. Pat. No. 4,420,535 describes such as baked enamel. Its basis is an aromatic-aliphatic random copolyamide with the structural unit:

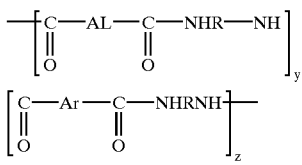

AL is the divalent hydrocarbon group of an unsubstituted aliphatic dicarboxylic acid with preferably 6 to 36 carbon atoms. As a rule, AL is $(CH_2)_x$, whereby x is from 4 to 34, preferably 6 to 12. Alternatively, AL can be the hydrocarbon group of an unsaturated dicarboxylic acid. R is tolyl phenyl or

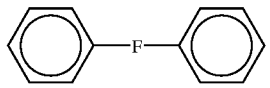

whereby F is 0, $CH_2$ or $SO_2$. It is also feasible that at least a portion of R is cycloaliphatic, e.g., cyclohexene. Ar is p-phenyl, y is between 35% and 80%, preferably approximately 65%, z is between 65% and 20%, preferably approximately 35% of the structural units. The copolyamide is produced in a manner known in the art, e.g., by reacting dicarboxylic acids with diisocyanates and/or diamines in a solvent, e.g., N-methyl-2-pyrrolidone (NMP). The polyamide as a baked enamel is typically also applied in an amide-based solvent such as NMP or a mixture of NMP and aromatic hydrocarbons.

Wires coated with such baked enamels have proven to be reliable for the stator windings of electric motors. They have proven to be inadequate for rotor windings, however, since the coatings tend to soften at elevated temperatures. Corresponding coils are not sufficiently stable at operating temperatures that in part exceed 155° C. and are subject to the centrifugal forces of motors whose speeds frequently range to around 10,000 rpm. In the prior art, the rotors of electric motors are therefore typically impregnated with a liquid thermosetting plastic, which subsequently cures. However, this procedure is complex compared to the bonding of baked enamel coated wires and is furthermore connected with the emission of hazardous substances.

SUMMARY OF THE INVENTION

It is therefore an object of the invention to develop a baked enamel, which is stable under load even at elevated temperatures.

This object is attained by the invention in that the enamel comprises a cross-linking agent that causes chemical cross-linking of the thermoplastic polymer under the action of heat, whereby the cross-linking agent comprises a polyvalent alcohol, a polyisocyanate as well as a polyol.

The chemical cross-linking of the thermoplastic polyamide, which forms the basis of the baked enamel, causes its resoftening temperature to increase significantly. It is possible, in particular, that the resoftening temperature is higher than the baking temperature for the enamel. As a consequence, the baked enamel's mechanical stability under load is maintained even at temperatures in the range of the baking temperature, while prior art baked enamels basically soften at such temperatures.

Of decisive significance is the fact that the cross-linking agent does not react, or at most reacts only partly, when the baked enamel is applied and cured and, particularly, when the solvent is expelled in an oven. Otherwise the resoftening of the baked enamel, which is required for bonding to the substrates, is impeded. The proportion of the cross-linking agent in the baked enamel is advantageously low. Preferred is a proportion of up to approximately 30 percent by weight, particularly 20 percent by weight, in relation to the thermoplastic polyamide.

A particular advantage of the baked enamel according to the invention is that its application and drying properties do not significantly differ from those of conventional baked enamels. In particular, conventional coating machines and ovens can be used for the production of baked enamel wires. Furthermore, the coatings exhibit good coating properties at comparable costs. The improved stability at temperatures above 150° C. makes it possible for the first time to use baked enamels to stabilize rotor windings.

The cross-linking agent comprises mutually reactive monomers of which at least one monomer is capable of reacting with the thermoplastic polyamide. The monomers react with each other and with the thermoplastic polyamide under the action of heat at the baking temperature of the enamel. Preferably, at least one of the monomers is an educt of the thermoplastic polyamide or reacts to one of its structural units during cross-linking. To facilitate processing, it is proposed that the cross-linking agent contain a solvent for the monomers and the thermoplastic polyamide.

After the baked enamel has been applied to the substrate it is typically dried in an oven for a few seconds at a temperature of between approximately 300° and 400° C. To make it possible to continue to use conventional ovens, it is advantageous if the cross-linking time of the cross-linking agent at the drying temperature is long compared to the drying time of the baked enamel.

Polyamides have proven to be suitable for the thermoplastic polymers, particularly copolyamides as described in the introduction. For their production, a mixture of diisocyanates is preferably used in which the molar ratio of toluene diisocyanate (TDI) to 4,4' methylene di(phenyl isocyanate) (MDI) is between 50:50 and 100:0, preferably around 60:40. A particular advantage of polyamide-based baked enamels is their good chemical stability, particularly their low solubility in solvents such as gasoline and oil.

Particularly high stability of the baked enamel at elevated temperatures is obtained if the polyamide is constituted of aromatic and aliphatic structural units as described above. Particularly molar ratios of aliphatic to aromatic structural units of from 60:40 to 50:50 mol percent, preferably about 56:44 mol percent have proven successful. While prior art copolyamides exhibit a significant decrease in heat resistance at these mixing ratios compared to the maximum obtainable value, cross-linked polymers according to the invention show increased heat resistance at this ratio. But even the heat resistance of prior art copolyamides with different ratios can be increased by cross-linkage according to the invention.

A preferred cross-linking agent, particularly for polyamides, comprises a polyvalent alcohol. Divalent alcohols have proven successful, particularly propylene glycol or dipropylene glycol

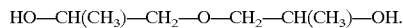

Furthermore, the cross-linking agent comprises a polyisocyanate, usable also, for example, as an educt of a polyamide.

Advantageously, the baked enamel is a mixture of at least one thermoplastic polymer, at least one cross-linking agent and one or several solvents. As solvents for copolyamide-based baked enamels, NMP or mixtures of NMP and aromatic hydrocarbons, e.g., cresol or xylene, have proven successful. Such a mixture can be produced as a homogenous storable liquid.

The described baked enamel is suitable for coating any type of substrate to be bonded under the action of heat. However, it is preferably used for coating wires, such as copper wires that are intended, for example, for coil windings.

The baked enamel is preferably applied not directly to the surface of a wire but to an internal insulation. This precludes short circuits during baking and improves electrical insulation. For the inner insulation, coatings based on polymers, for example, polyester, polyesterimide or polyamide-imide are suitable. Additional coating layers may be provided between the inner insulation and the baked enamel.

Preferably, the baked enamel as well as any inner insulation and any other coatings comprise several layers. Multi-layer application improves the quality of the coating and, in particular, prevents bubbles from forming as the solvents escape.

BRIEF DESCRIPTION OF THE DRAWING

Exemplary embodiments of the invention are explained in further detail below, with reference to the drawings in which.

DETAILED DESCRIPTION OF THE INVENTION

Figure 1:
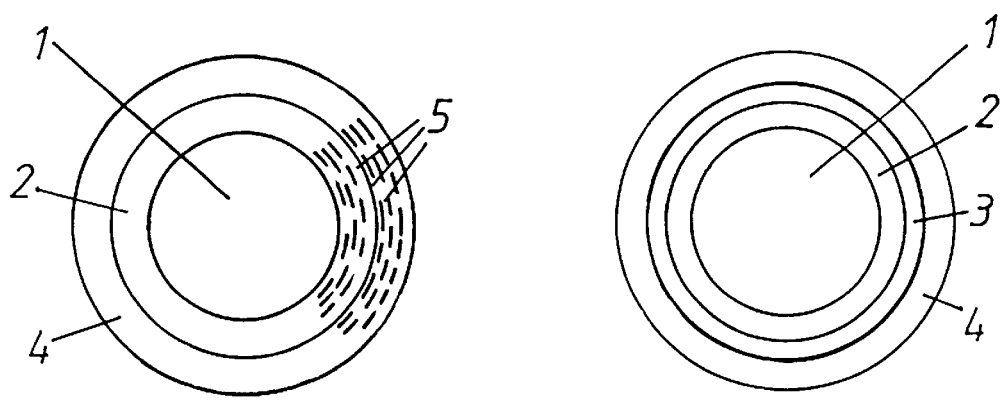
FIG. 1 shows a cross section through baked enamel wires.

FIG. 1 depicts schematic sections through different baked enamel wires (not drawn to scale). In each center there is a conductor (1), e.g., a copper wire, with a diameter of, for instance, from 0.1 to 5 mm. Conductor (1) is embedded in insulation (2) of, for example, polyesterimide. The thickness of insulation (2) is preferably between 10 and 100 μm. To adapt the mechanical and chemical properties to the different requirements, it is frequently advantageous to provide a coating (3) over insulation (2), e.g., of polyamide-imide, which is also insulating. As a rule, coating (3) is less thick than the underlying inner insulation (2). On the outside, the wire has a topcoat of baked enamel (4). This permits baking of adjacent wires in a coil into a solid composite by heating the coil. To obtain uniform and high quality of the coatings, it is advantageous to apply insulation (2), coating (3) and baked enamel (4) each as a coating of multiple layers (5).

The basis for the baked enamel is a copolyamide known in the art. The molar proportion of its aliphatic to aromatic structural units is 56% to 44%. A solvent with the following proportions serves as cross-linking agent:

| Dipropylene glycol | 33.03 g, |
|---|---|
| Xylene | 2.80 g, |
| Desmodur VL | 18.92 g, |
| NMP | 17.32 g. |

Desmodur VL is a polyisocyanate made by Bayer that comprises 31.5% by weight isocyanate. For the baked enamel, a homogenous liquid of 136 g polyamide, 27.2 g cross-linking agent and 18.1 g NMP was produced. The coating was used to coat a copper wire with an internal insulation.

Figure 2:
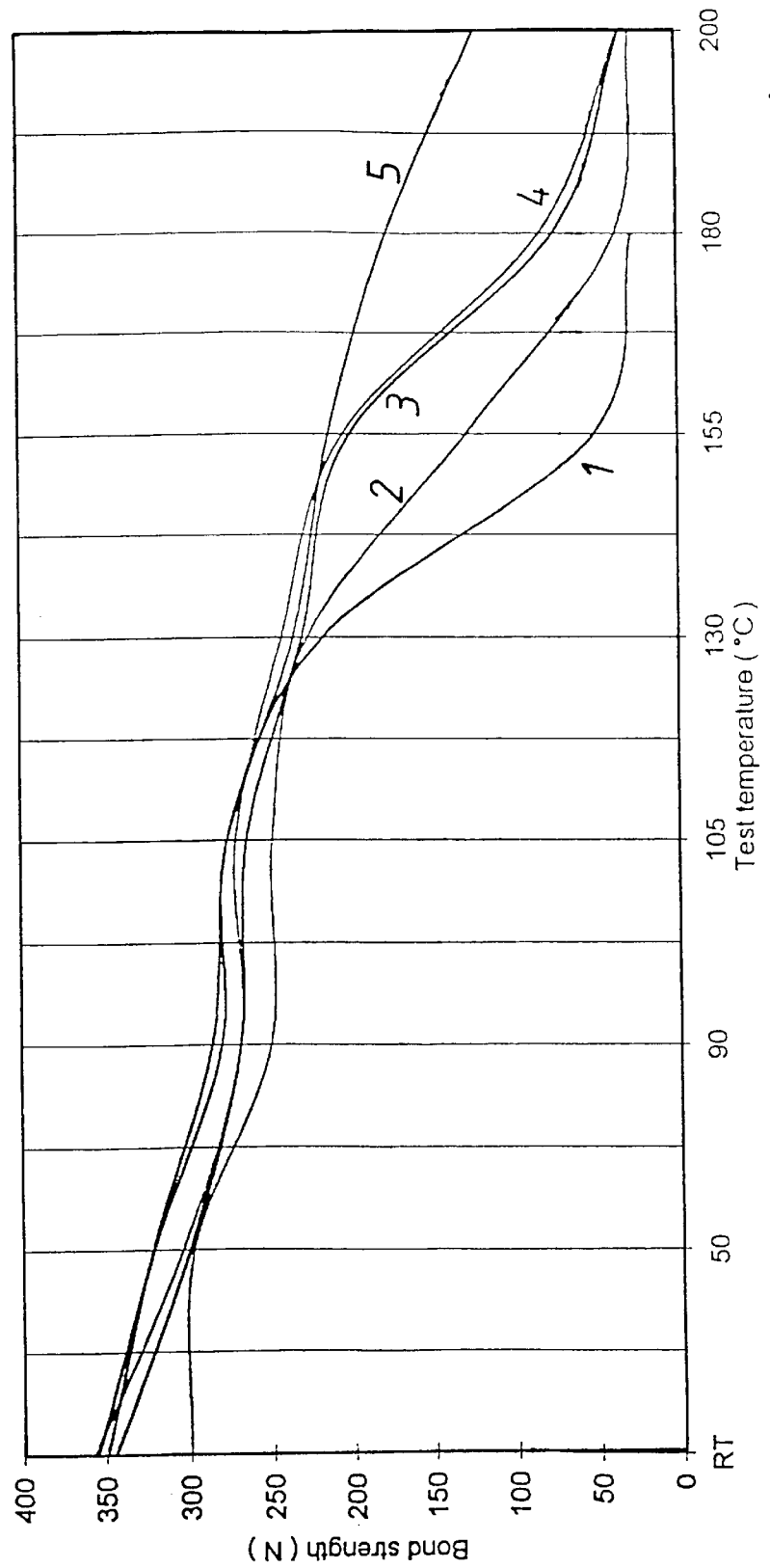
FIG. 2 shows the bonding strength of the baked enamel as a function of temperature.

FIG. 2 shows the bonding strength of different baked enamel wires as a function of temperature measured in accordance with Standard IEC 851-3.

A commercially available baked enamel wire, made by Lacroix & Kress and identified as T 180HR, coated with a polyamide baked enamel served as comparison example (Curve 1). The baking time was 30 seconds at 200° C. As may be seen, the baked enamel exhibits high mechanical resistance at around 130° C., which decreases rapidly, however, at higher temperatures. Particularly above 155° C., the wire is no longer suitable to withstand the mechanical stresses that occur in motor rotors.

Baked enamel wires according to the invention were produced in accordance with the specification and were baked for various times at 200° C. (test piece 2: 30 seconds; test piece 3: 5 minutes; test piece 4: 2.5 minutes; test piece 5: 20 minutes). While in the temperature range of up to 130° C. only minor differences are evident compared to the comparison example (Curve 1), the resistance at increased temperatures, particularly between 155° and 200° C., is clearly higher. The mechanical resistance of the cross-linked baked enamel in this temperature range clearly increases with increasing baking times. In particular, sufficient baking times make it possible to obtain a coating resoftening temperature of up to 300° C., which significantly exceeds the 200° C. baking temperature.

As a result, a baked enamel of high mechanical resistance at elevated temperatures is produced and wires coated therewith are particularly suitable for use in motor rotors.

What is claimed is:

1. A wire having an inner insulating layer and a layer made of a baked enamel applied to the inner insulating layer, the baked enamel comprising a thermoplastic polyamide made of aromatic and aliphatic structures, whose molar ratio of aromatic structure units is 60:40 to 50:50, as well as a cross-linking agent, which includes a multivalent alcohol, a polyisocyanate and a polyol, and the cross-linking period of the baked enamel is large in relation to the drying time of the baked enamel, so that the cross-linking agent does not react or reacts only partially during application and hardening of the baked enamel and the resoftening temperature of the baked enamel is greater than the temperature for baking the baked enamel.

2. A wire according to claim 1, characterized in that the cross-linking agent includes a mixture of monomers which are reactive with one another, at least one of the monomers being reactive with the thermoplastic polymer.

3. A wire according to claim 2, characterized in that a monomer of the cross-linking agent corresponds to a structural unit of the thermoplastic polymer.

4. A wire according to claim 1, characterized in that the baked enamel is a mixture of one or more thermoplastic polymers, cross-linking agents and solvents.

5. A wire according to claim 1, characterized in that the baked enamel (4) is applied onto an overcoat (3) located on the inner insulating layer (2).

6. A wire according to claim 1, characterized in that at least one of the baked enamel (4), inner insulating layer (2) and overcoat (3) comprise multiple layers (5).

7. A wire according to claim 1, characterized in that the molar ratio of aliphatic to aromatic structural units is 56:44.

8. A wire according to claim 1, characterized in that the proportion of the cross-linking agent is 20–30 weight percent in relation to the thermoplastic polyamide.

* * * * *